Aug. 26, 1930.  W. J. PASINSKI  1,774,289
TRANSFER MECHANISM
Original Filed July 19, 1926  5 Sheets-Sheet 1
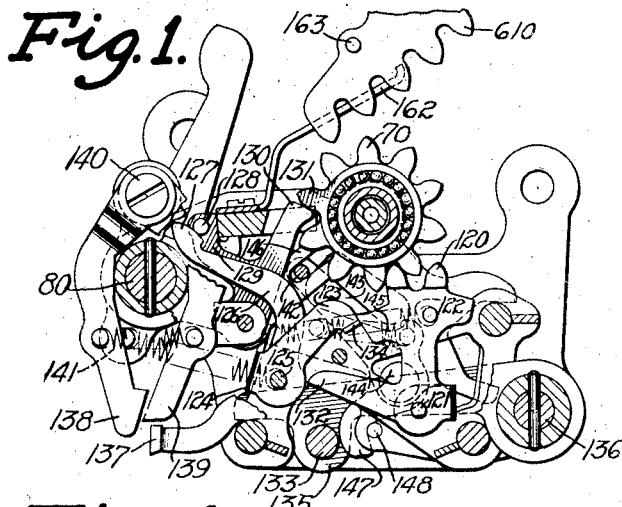
Fig. 1.
Fig. 2.
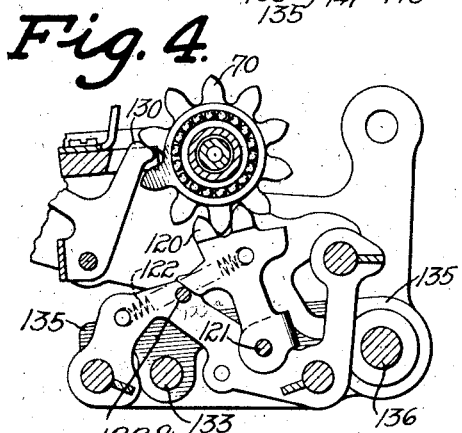
Fig. 4.
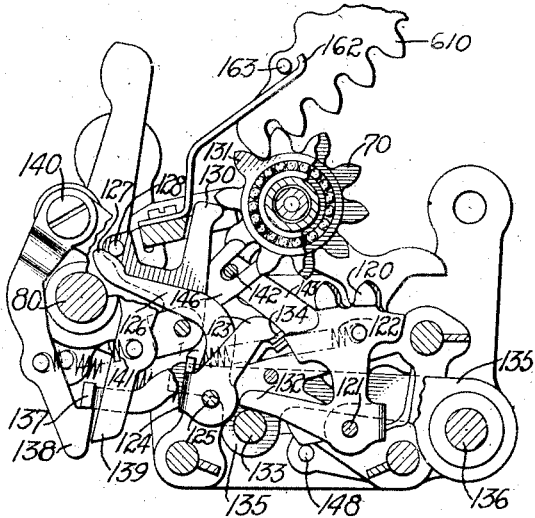
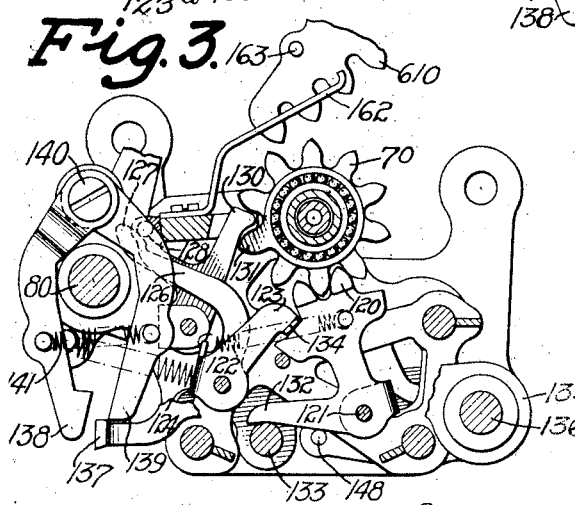
Fig. 3.
INVENTOR
Walter J. Pasinski
BY
Rector, Hibben, Davis & Macauley
ATTORNEYS

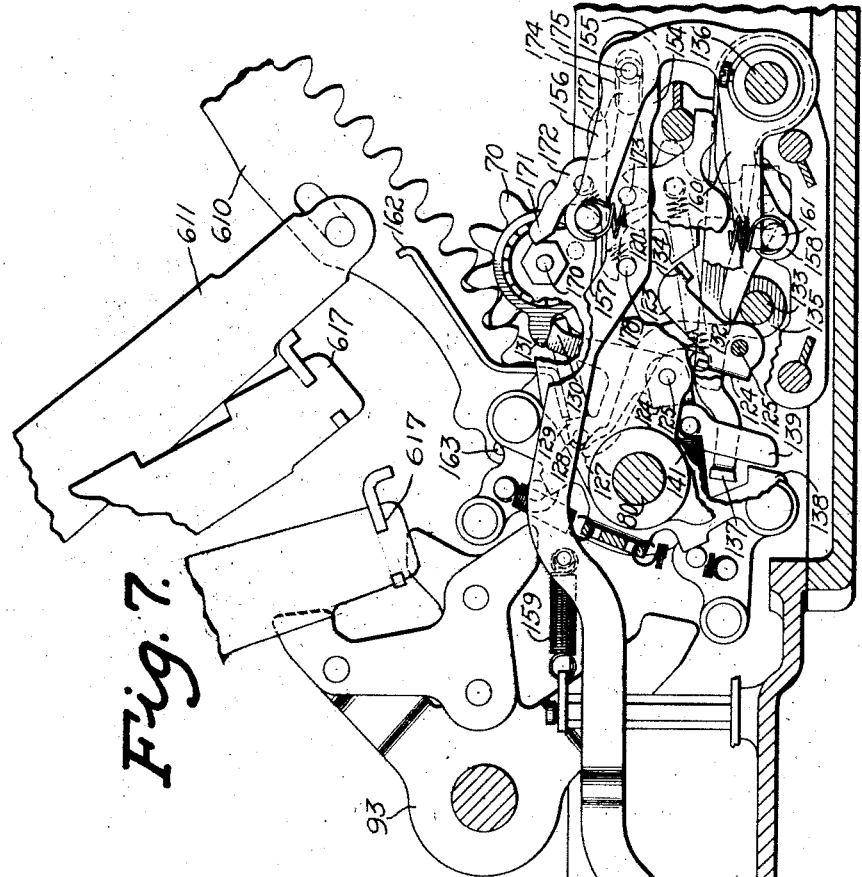

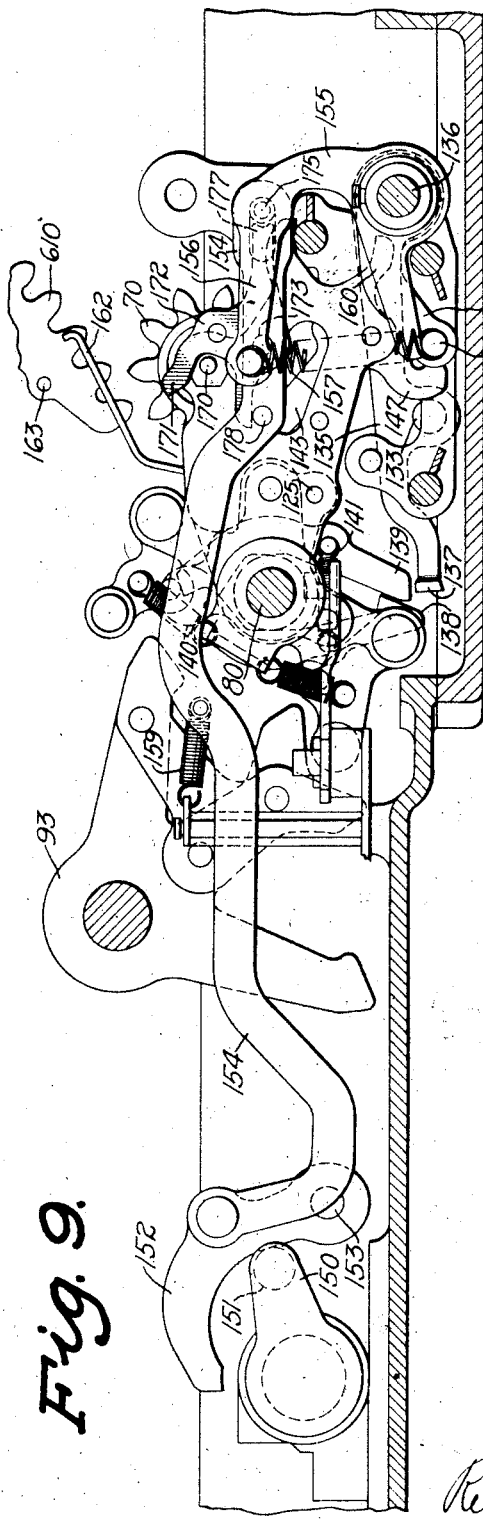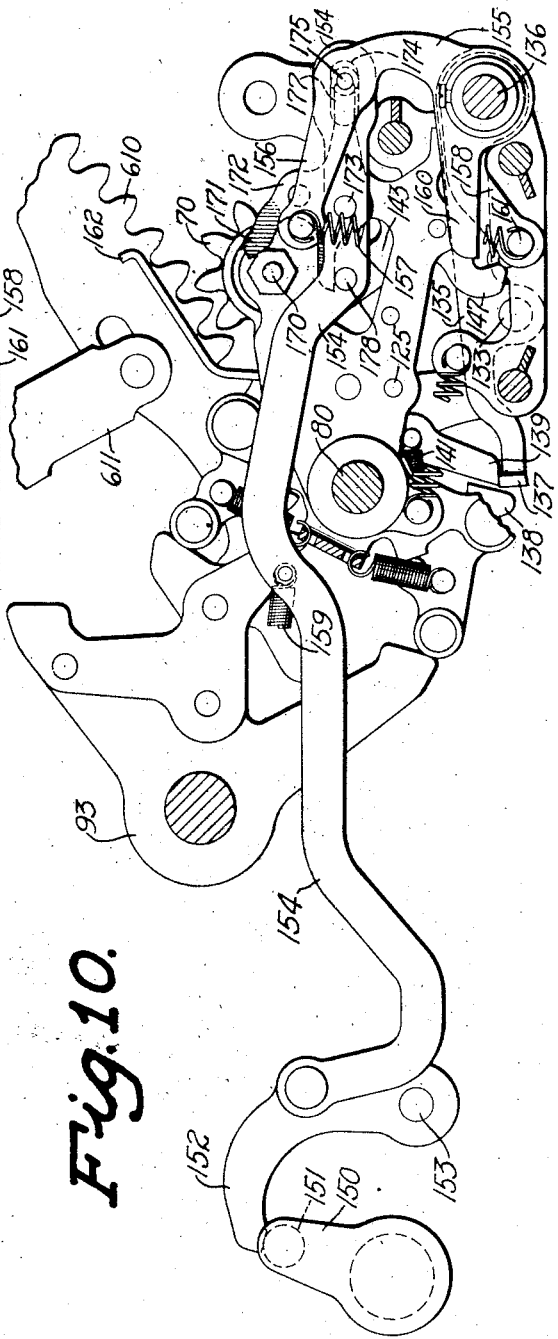
Fig. 9.
Fig. 10.

Aug. 26, 1930.  W. J. PASINSKI  1,774,289
TRANSFER MECHANISM
Original Filed July 19, 1926   5 Sheets-Sheet 5

INVENTOR
Walter J. Pasinski
BY
Rector, Hibben, Davis, & Macauley
ATTORNEYS

Patented Aug. 26, 1930

1,774,289

UNITED STATES PATENT OFFICE

WALTER J. PASINSKI, OF DETROIT, MICHIGAN, ASSIGNOR TO BURROUGHS ADDING MACHINE COMPANY, OF DETROIT, MICHIGAN, A CORPORATION OF MICHIGAN

TRANSFER MECHANISM

Original applications filed July 19, 1926, Serial No. 123,397, and February 25, 1927, Serial No. 170,869. Divided and this application filed February 21, 1927. Serial No. 169,787.

This invention relates to a transfer mechanism, particularly one of the type shown in my co-pending application Serial No. 123,397 filed July 19, 1926. The present application includes a modification disclosed in my co-pending application Serial No. 170,869, filed Feb. 25, 1927, and is a division of both of said prior applications.

The general object of the invention is to provide an improved transfer mechanism for effecting tens carries in the counters of a calculating machine.

A more particular object is to provide a transfer mechanism having an improved timing control of the restoring bail for restoring the transfer segments to normal position.

A further object is to provide an improved control for a restoring bail for disabling it when a total is being taken.

Other objects and advantages of the invention will appear from the specification and drawing.

An embodiment of the invention is shown in the accompanying drawings in which

Fig. 1 is a sectional side elevation showing the transfer mechanism in normal position and associated with a counter which is out of engagement with its actuator racks.

Fig. 2 is a sectional side elevation similar to Fig. 1, showing the transfer mechanism in "initial carry" position and the counter in engagement with the actuator racks.

Fig. 3 is a sectional side elevation similar to Fig. 1 showing the transfer mechanism in "full carry" position with the counter out of engagement with the actuator racks.

Fig. 4 is a partial sectional side elevation illustrating the construction of the transfer mechanism associated with the units wheel.

Fig. 7 is a sectional side elevation of the transfer mechanism including the actuating means for the restoring bail, showing the position the parts occupy at the end of a forward stroke in an addition operation.

Fig. 8 is an enlarged detail and section illustrating the special connections between the operating link and the restoring bail.

Fig. 9 is a sectional side elevation corresponding to Fig. 7, showing the position of the parts at the beginning of a forward stroke in an addition operation.

Fig. 10 is a view similar to Fig. 7 showing the parts in the position they occupy at the end of a forward stroke in an addition operation.

Figure 5:
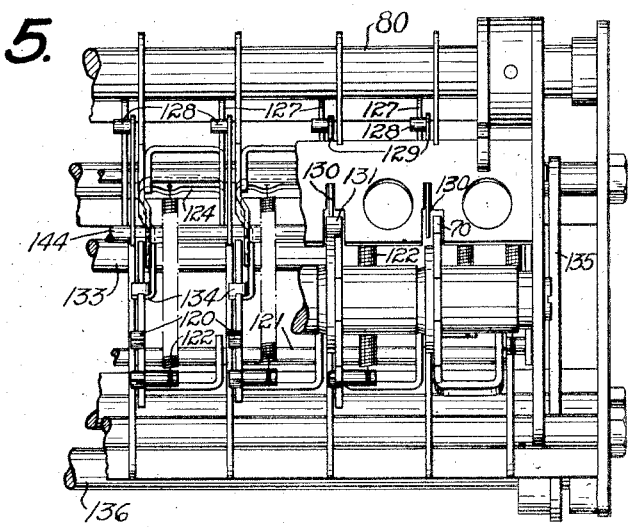
Fig. 5 is a plan view of one end of the frame carrying the transfer mechanism and the counter pinions.

The transfer mechanism is illustrated in connection with a standard type of Burroughs adding machine but it will be understood that it is not necessarily limited to use with this machine. It is shown associated with a counter comprising a series of toothed pinions 70 which may be moved into and out of engagement with actuator racks 610 carried by arms 611 that are controlled by a bail 617. The counter pinions are rocked into and out of engagement with the actuator racks by means of a cam 93 having a plurality of camming surfaces which may be selectively rendered active as explained in my co-pending application. An understanding of the control and the movement of the counters into and out of engagement with the racks is unnecessary for the purposes of the present application, it being sufficient to understand that the counter pinions normally stand out of engagement with the actuator racks and that during an initial operating movement or forward stroke in an addition operation, and while the racks 610 are descending, the counter pinions 70 remain out of engagement with the actuator racks but at the end of the initial movement or forward stroke they are rocked into engagement where they remain during the ascent of the racks until near the end of the final operating movement or return stroke when they are again rocked out of engagement. When a total is taken the counter pinions are rocked into engagement with the actuator racks at the beginning of the forward stroke instead of at the end and they are rocked out of engagement at the beginning of the return stroke. In the taking of a subtotal the action is the same as at the beginning of a forward stroke as in the taking of a total but at the beginning of the return stroke the pinions are not rocked out of engagement. Instead they remain in engagement until near the end of the return stroke.

Transfer segments

Figure 6:
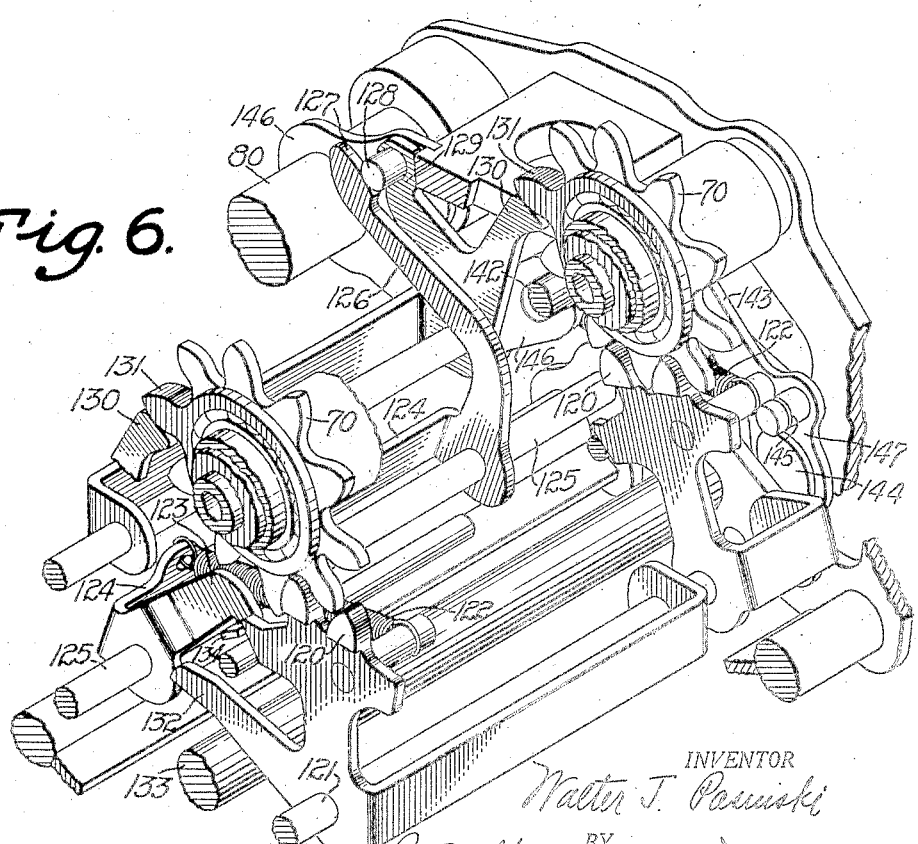
Fig. 6 is a perspective view of a portion of the transfer mechanism.

The transfer segments together with their detents and tripping pawls will be most easily understood by reference to the perspective view of Fig. 6.

The mechanism includes a series of toothed segments 120 pivoted on a shaft 121 and normally urged in a counter clockwise direction by springs 122. Each segment is held against movement in this direction by a detent 123 comprising one arm of a yoke 124 pivoted on a shaft 125, the other arm 126 of the yoke extending upwardly and rearwardly and being provided with a nose 127 positioned so as to be engaged by a stud 128 on an arm 129 of a tripping pawl 130. Each of the counter pinions 70 has one wide tooth or tripping projection 131 for tripping its respective pawl 130 when the pinion moves from its 9 to its 0 position. The two pinions illustrated in Fig. 6 are in their "0" positions and they move clockwise from these positions in adding operations. The pawls 130 also serve as stops for limiting the reverse rotation of the pinions when the counter is being restored to zero in the taking of a total or subtotal. The pawl 130 for each pinion controls the detent 123 for the transfer segment for the pinion of next higher order. It will be observed that the springs 122 for urging the transfer segments in the direction to effect a carry also serve to urge the detents 123 clockwise toward their position for arresting the transfer segments. It will be understood that there is a tripping pawl, a detent, and a transfer segment for each pinion, the construction being duplicated for each pinion except the units order pinion. It is not necessary to transfer to this pinion and there is no detent and tripping pawl for controlling its transfer segment. Instead the transfer segment operates against a frame stud 123ᵃ illustrated in Fig. 4.

When the right hand pinion 70 in Fig. 6 moves clockwise through its 9 to its zero position, it cams the pawl 130 rearwardly which causes the stud 128 to cam the nose 127 downwardly to move the arm 126 together with the yoke 124 and the detent 123 in a counter clockwise direction as viewed in Fig. 6. This moves the detent 123 out of the path of the transfer segment 120 thereby leaving the segment free to be moved by the spring 122 in a direction to effect a carry, such movement being, however, under the control of a restoring bail which will now be described.

Control mechanism for restoring bail

The restoring bail 133 is carried by two side arms 135 fixed to the shaft 136 illustrated in Fig. 1. One of the side arms 135 extends rearwardly beyond the restoring bail and this rearwardly projecting end is provided with a lateral lug 137 for cooperation with two timing latches 138 and 139. These two latches are pivoted on a pivot 140 carried by the counter frame and moving with it as the counter frame rocks about the shaft 80. The two latches are normally urged toward one another by a spring 141 connected to both of them.

The restoring bail is moved in one direction by an operating means including a rock arm 150 (Fig. 7) fixed to a shaft that oscillates with each operation of the machine. This rock arm carries a stud 151 operating against the under side of a cam arm 152 pivoted at 153 and connected to a link 154. The forward end of this link is connected to a U-shaped member 155 pivoted loosely on the shaft 136. The upper arm 156 of the member 155 extends rearwardly and is connected to one end of a spring 157 whose other end is connected to an arm 158 fixed to the shaft 136, which, as previously described, also has the side arm 135 of the restoring bail 133 fixed to it. The normal position of the link 154 is illustrated in Fig. 9, where the parts 150 and 152 are in the same position as illustrated in dotted lines in Fig. 7. During the forward stroke of the machine the rock arm 150 moves counter clockwise to the full line position of Fig. 7 and this cams the arm 152 clockwise to move the link 154 forward. Movement of the link causes a clockwise movement of the U-shaped member 155 which moves the arm 156 upwardly and tensions the spring 157. It will be observed that the slope of the cam surface on the under side of the arm 152 is gradual so that the operation of these parts gradually tensions the spring 157 during the forward stroke of the machine.

The link 154 and its associated part are returned to normal position during the return stroke of the machine by the spring 159 one end of which is connected to the link and the other end of which is connected to a stud on the machine frame, said spring being tensioned as the link 154 moves forwardly.

The timing and operation of the restoring bail 133 will be most easily understood by referring to Figs. 1, 2, and 3. During the forward stroke of the machine the tension that is placed on the spring 157, as above described, tends to move the arm 158 clockwise and since this arm is fixed to the shaft 136 to which the side arms 135 are also fixed, the tendency of the spring 157 is to move the restoring bail 133 upwardly. It is prevented from so moving by the engagement of the lateral lug 137 with the end of the timing latch 139, the position of the parts being illustrated in Fig. 1. This condition obtains until near the end of the forward stroke when the counter is rocked into engagement with the actuator racks. As the counter is moved into engagement with the racks the pivot 140 of the timing latches moves in a counter clockwise direction about the axis of the shaft 80. This swings the lower end of the timing latch 139 counter-clockwise and the parts are coordinated so that, after the counter pinions have left the transfer segments and engaged the actuator racks, the end of the latch 139 passes the lug 137 which frees the restoring bail and permits it to be snapped upward quickly. It first moves to the position of Fig. 7 for a purpose hereinafter described and then settles back to the position of Fig. 2 where the lateral lug 137 rests on the shoulder of the latch 138. The latch 138 does not interfere with the upward movement of the arm 135 as the lug 137 engages the lower end of the latch 138 and pushes it clockwise out of the way as the counter is rocked into engagement with the actuator racks.

It is while the restoring bail 133 is in the position of Fig. 2 and the counter pinions 70 are in engagement with the racks that the transfer segments are released for a carry. However, since the pinions are not in engagement with the transfer segments it is not desirable to effect a carry at this time as it would have no effect on the counter pinions. Accordingly, the transfer segments are permitted to have only a very limited movement to what is called their "initial carry" position. This movement is limited by the engagement of the arms or tail pieces 132 on the transfer segments with the restoring bail 133 as illustrated in Fig. 2. The restoring bail thus serves, when in this position, to hold the transfer segments in initial carry position.

During the return stroke of the machine the arm 150 is rocked in a clockwise direction which frees the link 154 to permit it to be moved rearwardly by the spring 159. This force tending to move it is transmitted through the arm 160 of the member 155 to the stud 161 on the arm fixed to the shaft 136 carrying the restoring bail arms 135. No movement can take place immediately, however, because the lug 137 on the restoring bail arm 135 is blocked by the shoulder on the timing latch 138 as illustrated in Fig. 2. Near the end of the return stroke the counter is rocked out of engagement with the actuator racks which causes the pivot 140 of the timing latches to move clockwise about the axis of the shaft 80. This moves the lower end of the timing latch 138 in a clockwise direction and the parts are coordinated so that after the counter has moved out of engagement with the racks and into engagement with the transfer segments, the shoulder passes from under the latch 137 and permits the spring 159 to move the restoring bail downwardly. This downward movement of the restoring bail frees the tripped transfer segments which then move to their "full carry" position which is limited by the restoring bail to such an extent that the segments move the extent of one tooth. The "full carry" position of the parts is illustrated in Fig. 3.

The description of how the restoring bail 133 is moved upwardly from the position of Fig. 1 has heretofore been made without regard to the position of the transfer segments 120. In addition to the functions already described this bail acts to restore the tripped transfer segments to their normal position. These tripped segments occupy the position of Fig. 3 and, as the restoring bail 133 is moved upwardly, it moves the transfer segments with it toward the Fig. 2 position. This movement occurs, as previously described, after the counter has moved out of engagement with the transfer segments so that the movement of the segments by the restoring bail does not rotate the counter pinions. The bail moves upwardly beyond its normal upward position, as illustrated in Fig. 7, in order that the transfer segments may be moved beyond normal position to be sure that all of their shoulders pass the detents 123 so as to permit these detents to be snapped by the spring 122 into arresting position to hold transfer segments in their normal position.

From the above, it will be seen that the timing of the restoring bail is controlled directly by the movements of the counter. The frame carrying the counter pinions carries the timing latches and moves them directly to control the restoring bail which insures that the restoring bail cannot operate until the counter pinions have been moved into their proper position with relation to either the actuator racks or the transfer segments, as the case may be. Another advantage to be noted is that the power for operating the restoring bail is furnished gradually during the forward stroke of the machine. Not only is the spring 157 for moving the restoring bail upwardly tensioned during this movement but the spring 159 for returning the restoring bail is tensioned during the forward stroke. The timing of the restoring bail permits these forces to act quickly but the forces themselves are built up gradually. In this manner the desired operation of the parts is secured without throwing a sudden load

Actuator rack guards

As a safe guard against accidental displacement of the actuator racks, the counter frame is provided with a comb plate 162 having fingers whose ends are bent laterally to be in position to engage studs 163 on the lower ends of the actuator racks 610. These comb plates prevent the actuator racks from jumping or rebounding when they are struck by the restoring bail 617 in returning the racks to their normal upward position. If the return stroke of the machine should be sudden, this bail might strike the levers 611 with sufficient force to throw the racks 610 slightly ahead of the bail and beyond the position to which they should move. If this should occur the counter wheels might be carried beyond the desired position and if any of these wheels should happen to be in a position to effect a carry, such carry would be effected even though the racks were subsequently returned to normal position. Whenever the counter is in engagement with the racks the fingers 162 are in position to engage the studs 163 to prevent the racks from being thrown beyond their proper position. However, these fingers do not interfere with the extra step of movement of the racks which takes place when a carry is effected on a second counter in the standard way in a Burroughs machine. This is due to the fact that the normal position of the counter is out of engagement with the racks to which position it is moved at the end of the return stroke of the machine. In other words, the counter is moved out of engagement with the racks before the extra step of movement takes place in the normal Burroughs carry and the movement of the counter out of engagement with the racks moves the fingers 162 out of position to engage the stud 163.

Aligning and locking bail for counter pinions

Provision is made for holding the counter pinions against movement during the time that they are being moved into and out of engagement with the racks. For this purpose the bail 142 (Figs. 1, 2, and 3) is provided which is carried by side arms 143 pivoted at 144 to the counter frame to cause the bail to move with the frame. This bail is normally urged in a counter-clockwise direction by a spring 145 which seats the bail in a plurality of slotted stops 146 (Fig. 2). One of the arms 143 carrying the bail is provided with a downwardly projecting cam end 147 (Fig. 1) adapted to engage a stationary stud 148 on one of the machine cross braces. As the counter frame rocks to move the counter into engagement with the racks, which movement is counter-clockwise from the position of Fig. 1, the cam 147 passes over the stationary stud 148 and gives the bail a quick throw in a counter-clockwise direction. The bail seats itself between the teeth of the pinions and prevents their accidental rotation while they are in intermediate or transitory position in their movement into engagement with the actuator racks. As the pinions engage the racks the cam 147 passes over the top of the stud 148, as illustrated in Fig. 2, which allows the spring 145 to quickly return the bail to its seat in the stops 146. As the counter is moved clockwise out of engagement with the racks, the nose 147 again goes over the stud 148 but in the opposite direction. This again throws the bail into engagement with the pinions to hold them against accidental rotation while they are being moved into engagement with the transfer segment. The bail thus acts quite rapidly and in an automatic manner to hold the pinions against rotation and in alignment during their movement into and out of engagement with the actuator racks. It will be observed that the movement of the counter frame actuates and controls the bail.

Special control of restoring bail during totaling operation

Special provision is made for preventing accidental disturbance of the transfer mechanism during the taking of a total. In order to understand these provisions it will be necessary to consider what action takes place in the taking of a total.

When a total is taken, the counter pinions are moved into engagement with the racks at the beginning of the forward stroke of the machine instead of at the end of the forward stroke as in adding. During the descent of the actuator racks, the pinions are rotated to their zero positions where they are stopped by their respective detents 130. During the forward stroke of the machine the link 154 is moved rearwardly as previously explained and this tends to move the restoring bail upwardly. The movement of the counter into engagement with the actuator racks at the beginning of the forward stroke frees the restoring bail from the timing latches as previously explained and hence this bail is free to move upward at the beginning of the forward stroke. As the restoring bail moves upwardly it restores the transfer segments and as they move clockwise toward their normal position the lateral lugs on the detents 123 ride upward over the slightly raised portions on the shoulders of the transfer segments illustrated in Figs. 1, 2, and 3. As the detents ride over the raised shoulders the noses 127 move away from the studs 128 on the detents 130 which leaves the detents in a floating condition. This would occur for only an instant and there is little likelihood of the detents moving but in order to insure against any possibility of movement, provision has been made for eliminating the upward movement of the restoring bail when a total is taken because it is not necessary to restore the transfer segments in the taking of a total.

This elimination of the movement of the restoring bail in the taking of a total is achieved by providing a breakable connection between the operating link 154 and the member connected to the shaft that moves the restoring bail. This breakable connection is controlled by movement of the counter and an arrangement is such that the connection is not broken when the counter moves into engagement with the racks at the end of the forward stroke as in addition but is broken if the counter is moved into engagement with the actuator racks at the beginning of the forward stroke as in the taking of a total.

The shaft on which the counter pinions are mounted is provided with an extension 170 for cooperation with the cam shaped end 171 of a dog 172 pivoted at 173 to the link 154. The link 154 is connected to the member 155 by a pin and slot connection, the link 154 being provided with a slot 174 and the member 155 carrying a pin 175. The dog 172 is normally urged in a counter-clockwise direction by a spring 176 to position its forwardly projecting end 177 in the path of the stud 175. The normal position of the parts is illustrated in Fig. 9 where it will be observed that, if the link 154 is moved to the right or forward in the machine, the arm 177 will engage the stud 175 to move the member 155 counter-clockwise.

Assuming that the parts are in the position illustrated in Fig. 9 and that the machine is operated to perform addition, the forward stroke of the machine will move the link 154 to the right to the position of Fig. 10. During this time the counter has remained in its normal position disengaged from the actuator racks. At the end of a forward stroke the counter is moved into engagement with the racks but in the meantime the link 154 has moved forwardly and carried the dog 172 with it so that the cam end 171 of the dog is out of the path of the extension 170 on the counter pinion shaft. Accordingly, when the counter moves into engagement with the actuator racks the dog 172 is not moved and there is no disturbance of the connection between the link 154 and the member 155.

Figure 11:
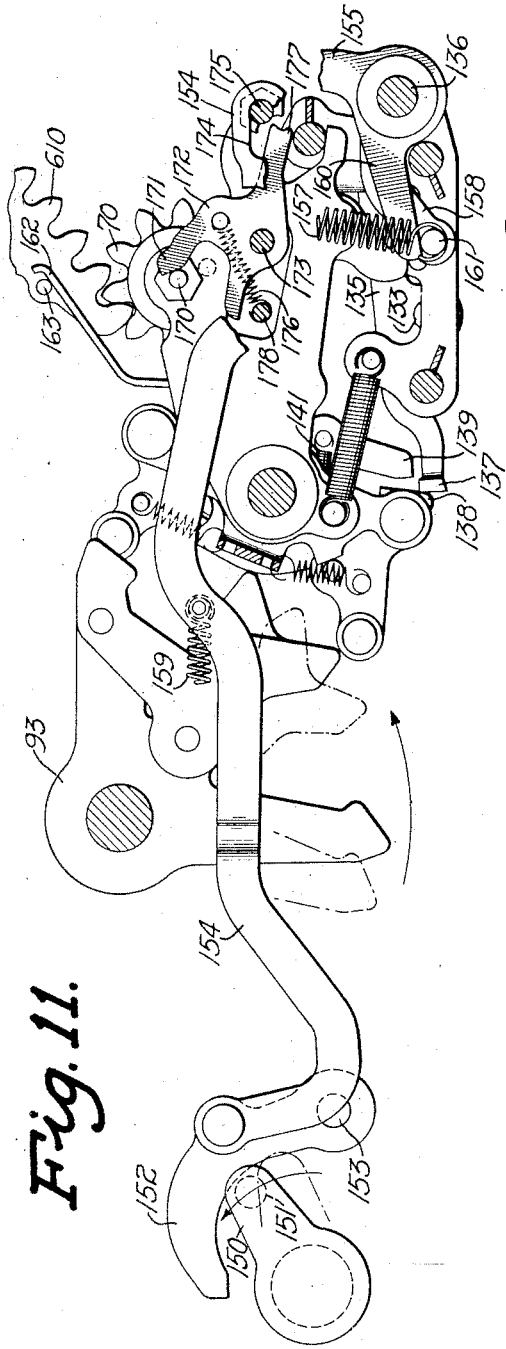
Fig. 11 is a sectional side elevation similar to Figs. 7 and 9, showing the position of parts at the beginning of a forward stroke in a totaling operation.
Figure 12:
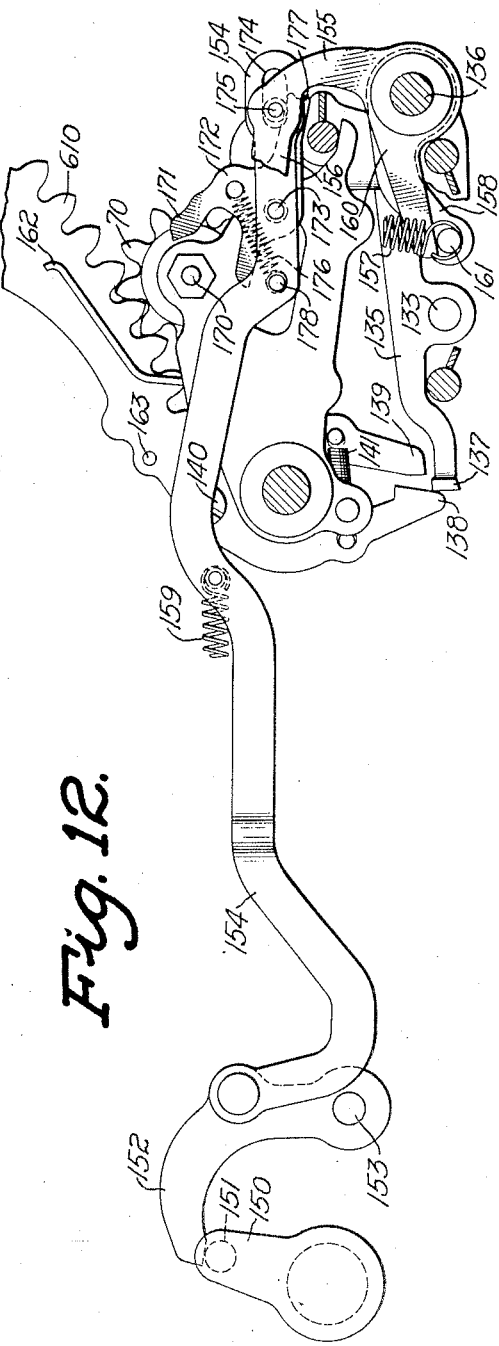
Fig. 12 is a view corresponding to Fig. 11 showing the position of the parts at the end of a forward stroke in a totaling operation.

In the taking of a total, however, the first action that takes place during the first part of the forward stroke of the machine is the rocking of the counter into engagement with the actuator racks. This occurs prior to the time that the link 154 has had an opportunity to move forwardly to any substantial extent. Assume that the parts are in the position of Fig. 9 and that the forward stroke of the machine is started in the taking of a total and the parts have moved to the position illustrated in Fig. 11. As the counter moves into engagement with the actuator racks the extension 170 engages the cam end 171 and swings the dog 172 to the position of Fig. 11 and out of the path of the stud 175 on the member 155. Accordingly, as the machine completes its forward stroke and moves to the position of Fig. 12 the link 154 merely moves on the pin 175 without moving the member 155. As a result the spring 157 is not tensioned and there is no force present to move the restoring bail upwardly. Inasmuch as the restoring bail is not moved upwardly the tripped transfer segments are not returned to normal and the detents 123 are not moved to free the pawls 130.

At the end of the return stroke and when the counter moves out of engagement with the racks, the dog 172 is freed so that it may be moved by the spring 176 back to normal position where it is stopped by the stud 178. The tripped transfer segments are restored to normal in the next operation of the machine in performing addition.

It will be understood that the structure shown is for purposes of illustration only and that variations may be made in it without departing from the spirit and scope of the invention as defined by the appended claims.

I claim:

1. The combination in a calculating machine having actuator racks, a movable counter having a plurality of pinions, transfer segments, and means for moving the counter to alternately engage its pinions with said racks and segments, of a bail for restoring said segments to normal after a transfer has been effected, means for urging said bail toward restoring position as said counter is moved out of engagement with said segments, and means controlled directly by said counter for timing the movement of said bail to restoring position.

2. The combination in a calculating machine having actuator racks, a movable counter having a plurality of pinions, transfer segments, and means for moving the counter to alternately engage its pinions with said racks and segments, of a bail for holding said segments in initial carry position after they have been tripped to effect a transfer, means for urging said bail toward segment-releasing position as the counter is moved into engagement with said segments, and means controlled directly by said counter for timing the movement of the bail to releasing position.

3. The combination in a calculating machine having actuator racks, a movable counter having a plurality of pinions, transfer segments, and means for moving the counter to alternately engage its pinions with said racks and segments, of a bail for restoring said segments to normal and for holding them in initial carry position after they have been tripped to effect a transfer, means for urging said bail toward segment-restoring position as said counter is moved out of engagement with said segments and for urging it toward segment-releasing position as the counter is moved into engagement with said segments, and means controlled directly by said counter for timing the release of the bail to restoring and to releasing positions.

4. The combination in a calculating machine having actuator racks, a movable counter having a plurality of pinions, transfer segments, and means for moving the counter to alternately engage its pinions with said racks and segments, of a bail for restoring said segments to normal after a transfer has been effected, means for urging said bail toward segment-restoring position as the counter is moved out of engagement with said segments, a detent for preventing movement of the bail, and means movable directly by said counter as it moves out of engagement with said segments for releasing said detent to permit said bail to be suddenly moved to restore the segments.

5. The combination in an accounting machine, having actuator racks, a counter having a plurality of pinions carried by a frame mounted on a shaft about the axis of which it may be rocked to move the counter pinions into and out of engagement with the racks, and transfer segments for the counter, of a bail urged to a position to restore said transfer segments to normal after a transfer has been effected, and a detent pivoted to the frame above the axis of the shaft and extending below said axis and being in contact with the side of said shaft so that movement of the frame will move the lower end of the detent to time the release of the bail.

6. The combination in a calculating machine having actuator racks, a movable counter having a plurality of pinions, transfer segments, and means for moving the counter to alternately engage its pinions with said racks and segments, of a bail for holding said segments in initial carry position after they have been tripped to effect a transfer, means for urging said bail toward segment-releasing position, a detent for preventing movement of said bail, and means movable directly by said counter as it moves into engagement with said segments for releasing the detent to permit sudden movement of the bail to releasing position.

7. The combination in a calculating machine having a forward and a return stroke of movement, actuator racks, a counter having a plurality of pinions movable into and out of engagement with said racks, and transfer segments for said counter, of a bail for restoring said segments to normal after a transfer has been effected, means for gradually storing energy during the forward stroke of said machine for urging said bail toward segment-restoring position, and a detent for the bail responsive to movement of the counter towards the racks for timing the release of said bail to permit its sudden actuation.

8. The combination in a calculating machine having actuator racks, a counter having a plurality of pinions movable into and out of engagement with said racks, and transfer segments for said counter, of a bail for restoring said segments to normal after a transfer has been effected, an actuating spring for said bail, a main operating shaft, a cam with connections to said spring for tensioning the same to urge the bail toward restoring position, and detent mechanism responsive to the position of the counter in its movement towards the racks for timing the release of the bail.

9. The combination in a calculating machine having actuator racks, a movable counter having a plurality of pinions, transfer segments and means for moving the counter to alternately engage its pinions with said racks and segments, of a bail for restoring said segments after a transfer has been effected and for holding them in initial carry position after they have been tripped to effect a transfer, means for urging said bail toward segment-restoring and toward segment-releasing positions, a detent mechanism for preventing movement of said bail, and means movable directly by said counter for releasing the detent mechanism as the counter moves into and out of engagement with the segments.

10. The combination in a calculating machine having actuator racks, a counter having a plurality of pinions carried by a rockable frame, transfer segments, and means for rocking the frame to alternately engage said pinions with the racks and segments, of a bail for restoring said segments to normal after a transfer has been effected, means for urging said bail toward segment-restoring position as the pinions move out of engagement with the segments, and a detent mechanism carried by and movable with said frame for releasing the bail at a predetermined point in the movement of the counter.

11. The combination in a calculating machine having actuator racks, a counter having a plurality of pinions carried by a rockable frame, transfer segments, and means for rocking the frame to alternately engage said pinions with the racks and segments, of a bail for holding the segments in initial carry position when they have been tripped to effect a transfer, means for urging the bail toward segment-releasing position as the pinions move into engagement with the segments, and a detent mechanism carried by said frame and movable with it to release the bail at a predetermined point in the movement of the counter.

12. The combination in a calculating machine having actuator racks, a counter having a plurality of pinions carried by a frame which may be rocked to move the pinions into and out of engagement with the racks, and transfer segments for the counter, of a bail for restoring said segments to normal after a transfer has been effected and for holding them in initial carry position, and a pair of detent pawls responsive to movements of said frame, one of said pawls serving to block the movement of the bail in direction to restore the segments until the frame has reached a predetermined position and the other pawl serving to prevent movement of the bail to release the initial carry until the frame has reached a predetermined position.

13. The combination in a calculating machine provided with a counter having a plurality of pinions, transfer segments therefor, and a restoring bail for said segments, of means for moving said restoring bail to restore the segments when the counter pinions are moved out of engagement with the segments at the beginning of an operation of the machine, and means operated by said counter when moved out of engagement with said segments at the beginning of an operation of the machine in the taking of a total for preventing the restoring bail from being moved.

14. The combination in a calculating machine provided with a counter having a plurality of counter pinions, transfer segments therefor, and a restoring bail, of means for operating the restoring bail to restore the transfer segments, and means operated by the counter as it moves out of engagement with the transfer segments at the beginning of the forward stroke of the machine, as in taking a total, for preventing the restoring bail operating means from operating the bail.

15. The combination in a calculating machine provided with a counter comprising a plurality of counter pinions, transfer segments therefor, and a restoring bail for the segments, of means connected to the bail for operating it to restore the transfer segments, and means operated by the counter as it is moved out of engagement with the transfer segments at the beginning of an operation of the machine in the taking of a total for disconnecting the connection between the bail operating means and the bail.

16. The combination in a calculating machine having an initial and a final operating movement, a counter having counter pinions, transfer segments therefor, and a restoring bail for the segments, of means for operating the restoring bail during the forward stroke of the machine, and means under the control of the counter for preventing the restoring bail from being operated, said means being operable when the counter is moved out of engagement with the transfer segments at the beginning of an initial operation of the machine but being removed from control of the counter when the counter is not moved out of engagement with the transfer segments until the end of the initial operation of the machine.

17. The combination in a calculating machine provided with a counter having counter pinions, transfer segments therefor, and a restoring bail for the segments, of operating means for moving the bail during the forward stroke of the machine, disconnectible connections between the operating means and the restoring bail under the control of the counter, said connections having provisions for being moved to disconnecting position by the counter when the latter is moved out of engagement with the transfer segments at the forward stroke of the machine but being removed from the control of the counter when the counter is not moved out of engagement with the transfer segments until the end of the forward stroke of the machine.

18. the combination in a calculating machine having an initial and a final operating movement, a counter having pinions, transfer segments therefor, and a restoring bail for the segments, of operating means for causing operation of the restoring bail during the initial operating movement of the machine, a breakable connection between the operating means and the restoring bail, and means for automatically breaking said connection when the counter is moved out of engagement with the transfer segments at the beginning of an initial operating movement of the machine.

19. The combination in a calculating machine provided with a movable counter frame carrying a counter having counter pinions, transfer segments therefor, and a restoring bail for the segments, of operating means for operating the restoring bail during the forward stroke of the machine, disconnectible connections between the operating means and the bail including a pivoted dog, and means carried by the counter frame for moving said dog to break the connection when the counter moves out of engagement with the transfer segments at the beginning of the forward stroke of the machine.

20. The combination in a calculating machine provided with a counter having counter pinions, transfer segments therefor, and a restoring bail for the segments, of an operating means for the restoring bail including a link, disconnectible connections between the link and the restoring bail including a pivoted dog carried by the link, said dog being in a position to be operated by the counter when it is moved out of engagement with the transfer segments at the beginning of the forward stroke of the machine but being removed from the path of the counter by the movement of the link during the forward stroke so that when the counter is moved out of engagement with the transfer segments at the end of the forward stroke it does not move the dog.

21. The combination in a calculating machine having actuator racks, a counter having a plurality of pinions carried by a rockable frame, transfer segments, and means for rocking the frame to alternately engage the counter pinions with said racks and segments, of a bail for restoring said segments after a transfer has been effected and for holding said segments in initial carry position after they have been tripped to effect a transfer, means for urging said bail toward segment-restoring position as the counter moves out of engagement with the segments, means for urging said bail toward segment-releasing position as the counter moves into engagement with the segments, and a detent mechanism carried by said frame for restraining movement of the bail in both directions, said detent mechanism being movable with the frame to release the bail at predetermined points in the movement of the counter.

22. The combination in a calculating machine having a forward and return stroke of movement, actuator racks, a movable counter having a plurality of pinions, transfer segments, and means for moving the counter to alternately engage its pinions with said racks and segments, of a bail for restoring said segments to normal after a transfer has been effected, mechanism for gradually storing energy during the forward stroke of the machine in a means for urging said bail toward segment-restoring position, and a detent for preventing movement of said bail, said detent being movable with the counter to suddenly release the bail after the counter is moved out of engagement with the transfer segments.

23. In a transfer mechanism for a calculating machine provided with a counter having a plurality of pinions, a transfer segment having a tail piece, said segment being adapted to move one of said counter pinions to effect a transfer, a spring urging said segment in transfer effecting direction, a detent normally preventing movement of said segment in said direction, said detent comprising a yoke one arm of which contacts said segment and the other arm of which is offset laterally and projects into the path of a projection on a trip pawl positioned to be engaged by a wide tooth on the counter pinion of next lower order, and a bail for engaging the tail piece of said segment to move it to restored position and to hold it in initial carry position.

In testimony whereof, I have subscribed my name.

WALTER J. PASINSKI.

CERTIFICATE OF CORRECTION.

Patent No. 1,774,289.  Granted August 26, 1930, to

WALTER J. PASINSKI.

It is hereby certified that error appears in the printed specification of the above numbered patent requiring correction as follows: Page 7, line 84, after the word "at" insert the words the beginning of; same page, line 90, claim 18, for "the" read The; and that the said Letters Patent should be read with these corrections therein that the same may conform to the record of the case in the Patent Office.

Signed and sealed this 28th day of October, A. D. 1930.

(Seal)

M. J. Moore,
Acting Commissioner of Patents.